United States Patent
Yoneoka et al.

(10) Patent No.: US 9,783,138 B2
(45) Date of Patent: Oct. 10, 2017

(54) VEHICLE CONTROL DEVICE

(71) Applicant: HITACHI AUTOMOTIVE SYSTEMS, LTD., Hitachinaka-shi, Ibaraki (JP)

(72) Inventors: Shinichiro Yoneoka, Hitachinaka (JP); Yasuhiko Okada, Hitachinaka (JP); Chihiro Sato, Hitachinaka (JP); Koji Yuasa, Hitachinaka (JP); Masahiro Toyohara, Hitachinaka (JP); Yasushi Sugiyama, Hitachinaka (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 0 days.

(21) Appl. No.: 14/769,735

(22) PCT Filed: Jan. 31, 2014

(86) PCT No.: PCT/JP2014/052195
§ 371 (c)(1),
(2) Date: Aug. 21, 2015

(87) PCT Pub. No.: WO2014/132740
PCT Pub. Date: Sep. 4, 2014

(65) Prior Publication Data
US 2016/0001716 A1 Jan. 7, 2016

(30) Foreign Application Priority Data

Feb. 27, 2013 (JP) ................................ 2013-036639

(51) Int. Cl.
*B60R 16/023* (2006.01)
*G07C 5/08* (2006.01)
(Continued)

(52) U.S. Cl.
CPC ............ *B60R 16/023* (2013.01); *G05B 15/02* (2013.01); *G06F 13/4291* (2013.01); *G07C 5/0808* (2013.01)

(58) Field of Classification Search
CPC .... B60R 16/023; G07C 5/0808; G05B 15/02; G06F 13/4291
See application file for complete search history.

(56) References Cited

U.S. PATENT DOCUMENTS

| 6,170,323 B1 | 1/2001 | Enomoto et al. |
| 2006/0009886 A1 | 1/2006 | Sakurai et al. |
| 2011/0307209 A1* | 12/2011 | Dittfeld ............... B60R 21/0173 702/120 |

FOREIGN PATENT DOCUMENTS

| JP | 03-135645 A | 6/1991 |
| JP | 04-170829 A | 6/1992 |

(Continued)

*Primary Examiner* — Anne M Antonucci
(74) *Attorney, Agent, or Firm* — Volpe and Koenig, P.C.

(57) ABSTRACT

In a vehicle control device in which a driver circuit which does not have a computing function and a computing device communicate with each other, there is provided a technology which can efficiently diagnose that both the driver circuit and the computing device normally communicate with each other by a simple technique. The vehicle control device according to the present invention transmits diagnosis data as a control command from a computing portion to the driver circuit, and the driver circuit sends inverted diagnosis data in which the diagnosis data is bit-inverted back to the computing portion. The computing portion diagnoses whether or not the communication between the computing portion and the driver circuit is normally performed, by using the diagnosis data and the inverted diagnosis data.

11 Claims, 8 Drawing Sheets

(51) Int. Cl.
    *G05B 15/02*     (2006.01)
    *G06F 13/42*     (2006.01)

(56) References Cited

FOREIGN PATENT DOCUMENTS

| | | |
|---|---|---|
| JP | 10-069440 A | 3/1998 |
| JP | 2000-312151 A | 11/2000 |
| JP | 2010-116165 A | 5/2010 |
| JP | 2011-229079 A | 11/2011 |

\* cited by examiner

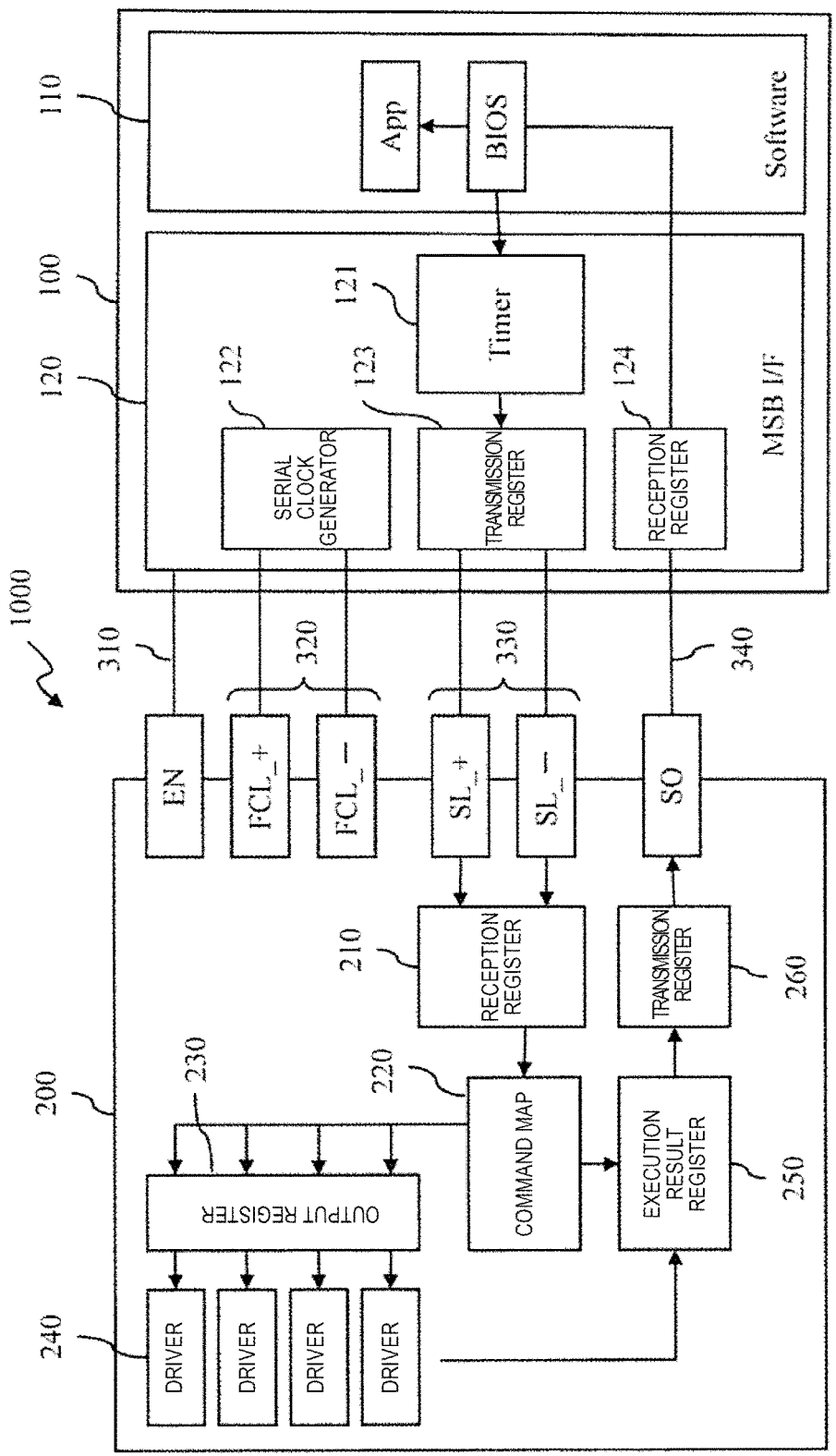
[Fig. 1]

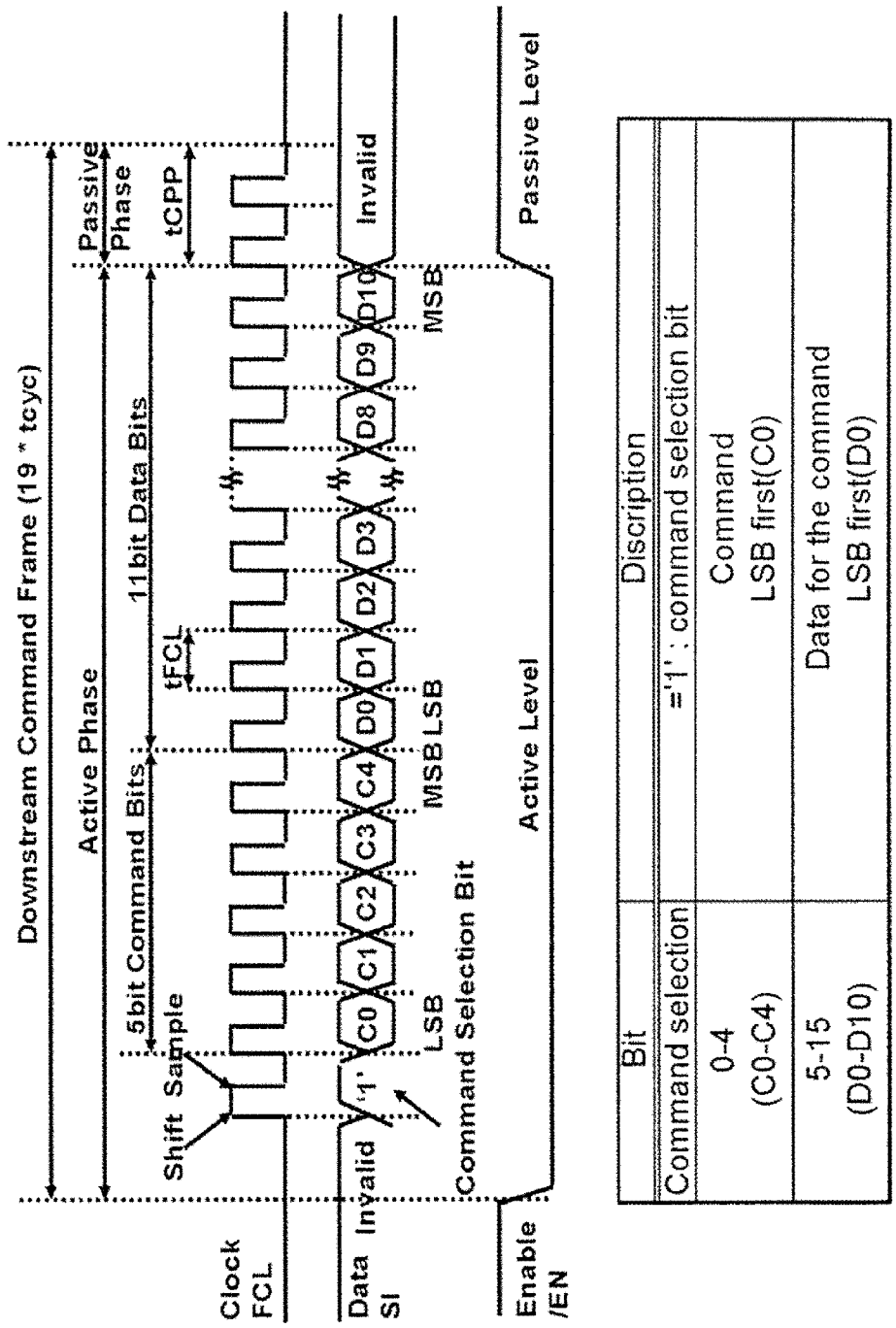
[Fig. 2]

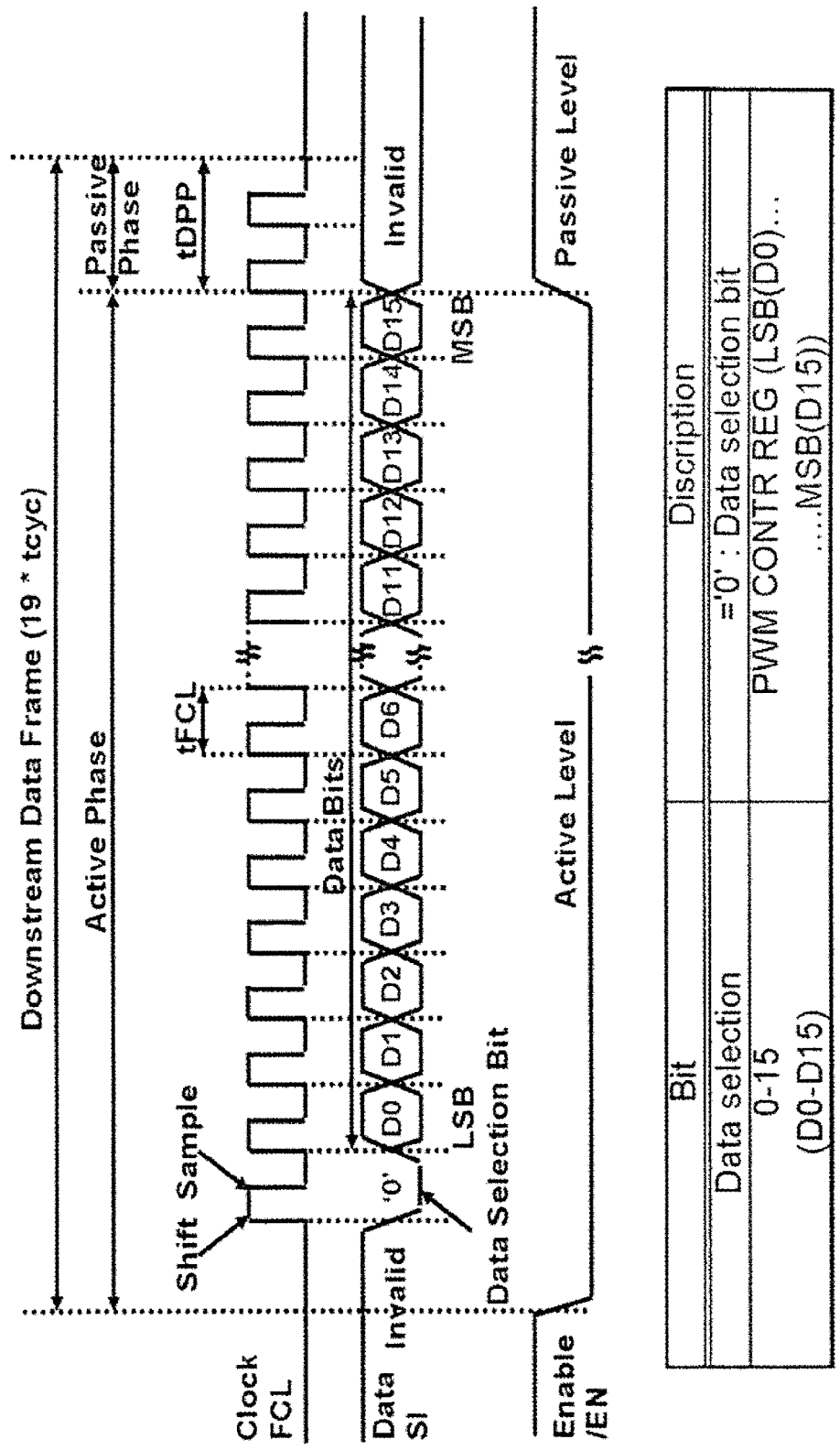
[Fig. 3]

[Fig. 4]

| # | ITEM | C0 | C1 | C2 | C3 | C4 | D0 | D1 | D2 | D3 | D4 | D5 | D6 | D7 | D8 | D9 | D10 |
|---|---|---|---|---|---|---|---|---|---|---|---|---|---|---|---|---|---|
| 1 | RD_DATA | 0 | 1 | 0 | 1 | 0 | 0 | 0 | 1 | 0 | 1 | 0 | 1 | 0 | 1 | 0 | 0 |
| 2 | IC SETTING#1 | 0 | 1 | 0 | 0 | 1 | IC Setting Data#1 | | | | | | | | | | |
| 3 | IC SETTING#2 | 0 | 1 | 1 | 0 | 1 | IC Setting Data#2 | | | | | | | | | | |
| 4 | IC SETTING#3 | 0 | 1 | 1 | 1 | 0 | IC Setting Data#3 | | | | | | | | | | |
| 5 | IC SETTING#4 | 0 | 1 | 0 | 0 | 1 | IC Setting Data#4 | | | | | | | | | | |
| 6 | IC SETTING#5 | 1 | 0 | 0 | 1 | 1 | IC Setting Data#5 | | | | | | | | | | |
| 7 | IC SETTING#6 | 1 | 0 | 0 | 1 | 0 | IC Setting Data#6 | | | | | | | | | | |
| 8 | IC SETTING#7 | 1 | 0 | 1 | 1 | 1 | IC Setting Data#7 | | | | | | | | | | |
| 9 | IC SETTING#8 | 1 | 1 | 0 | 0 | 0 | IC Setting Data#8 | | | | | | | | | | |
| 10 | IC SETTING#9 | 1 | 1 | 0 | 0 | 0 | IC Setting Data#9 | | | | | | | | | | |
| 11 | IC SETTING#10 | 1 | 1 | 0 | 1 | 1 | IC Setting Data#10 | | | | | | | | | | |
| 12 | IC SETTING#11 | 1 | 1 | 0 | 0 | 0 | IC Setting Data#11 | | | | | | | | | | |
| 13 | IC SETTING#12 | 1 | 1 | 0 | 0 | 1 | IC Setting Data#12 | | | | | | | | | | |
| 14 | IC SETTING#13 | 1 | 1 | 1 | 0 | 0 | IC Setting Data#13 | | | | | | | | | | |
| 15 | IC SETTING#14 | 1 | 1 | 1 | 0 | 1 | IC Setting Data#14 | | | | | | | | | | |
| 16 | IC SETTING#15 | 1 | 1 | 1 | 1 | 0 | IC Setting Data#15 | | | | | | | | | | |

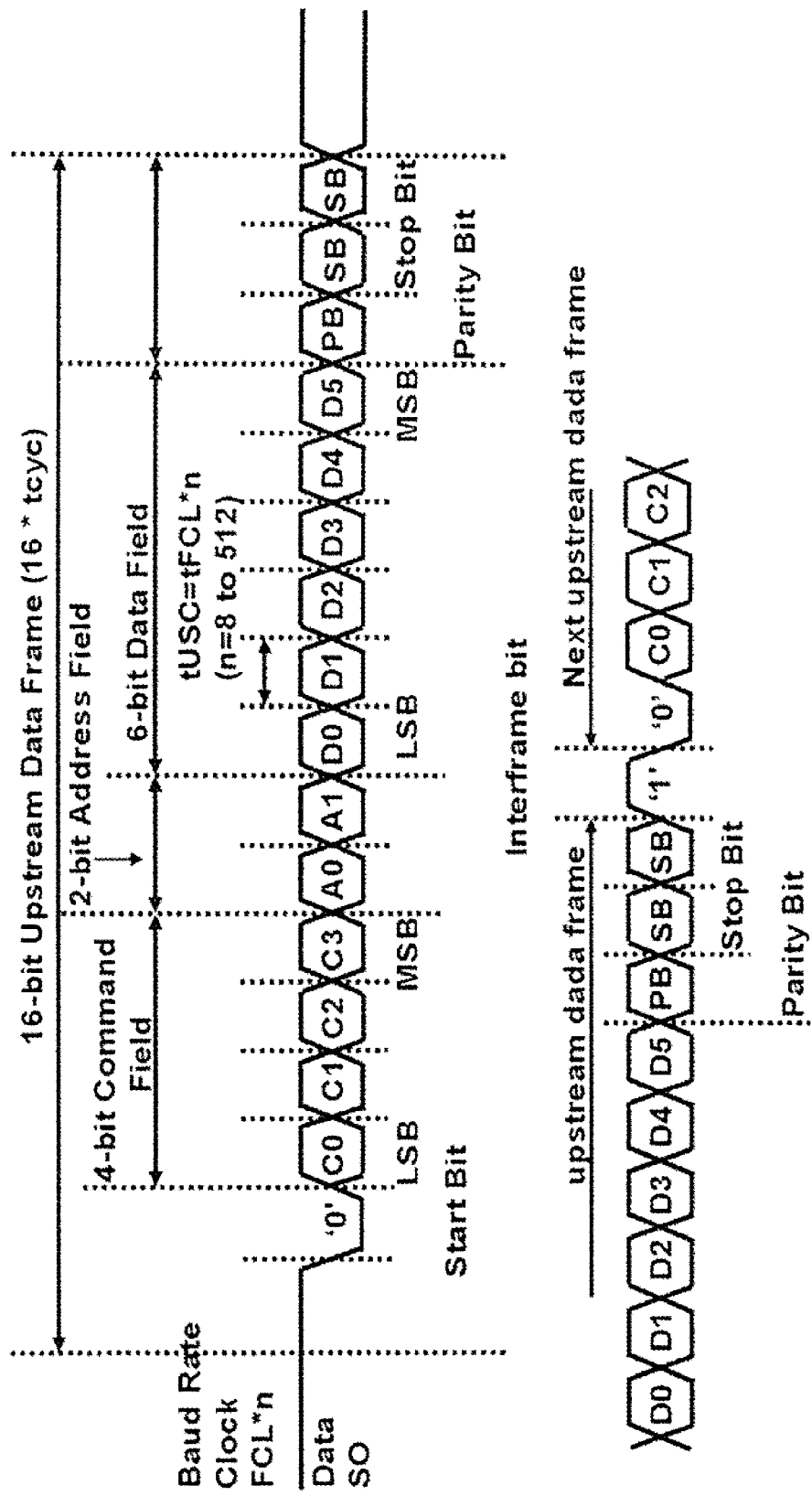

[Fig. 6]

| # | ITEM | C0 | C1 | C2 | C3 | A0 | A1 | D0 | D1 | D2 | D3 | D4 | D5 |
|---|---|---|---|---|---|---|---|---|---|---|---|---|---|
| 1 | IC CONFIG#1 | 0 | 0 | 0 | 1 | 0 | 0 | | IC Configuration DATA#1 | | | | |
| 2 | IC CONFIG#2 | | | | | 0 | 1 | | IC Configuration DATA#2 | | | | |
| 3 | IC CONFIG#3 | | | | | 1 | 0 | | IC Configuration DATA#3 | | | | |
| 4 | IC CONFIG#4 | | | | | 1 | 1 | | IC Configuration DATA#4 | | | | |
| 5 | IC CONFIG#5 | 0 | 0 | 1 | 0 | 0 | 0 | | IC Configuration DATA#5 | | | | |
| 6 | IC CONFIG#6 | | | | | 0 | 1 | | IC Configuration DATA#6 | | | | |
| 7 | IC CONFIG#7 | | | | | 1 | 0 | | IC Configuration DATA#7 | | | | |
| 8 | IC CONFIG#8 | | | | | 1 | 1 | | IC Configuration DATA#8 | | | | |
| 9 | IC DIAG#1 | 0 | 0 | 1 | 1 | 0 | 0 | | Driver Diagnosis DATA#1 | | | | |
| 10 | IC DIAG#2 | | | | | 0 | 1 | | Driver Diagnosis DATA#2 | | | | |
| 11 | IC DIAG#3 | | | | | 1 | 0 | | Driver Diagnosis DATA#3 | | | | |
| 12 | IC DIAG#4 | | | | | 1 | 1 | | Driver Diagnosis DATA#4 | | | | |
| 13 | IC DIAG#5 | 0 | 1 | 0 | 0 | 0 | 0 | | Driver Diagnosis DATA#5 | | | | |
| 14 | IC DIAG#6 | | | | | 0 | 1 | | Driver Diagnosis DATA#6 | | | | |
| 15 | IC DIAG#7 | | | | | 1 | 0 | | Driver Diagnosis DATA#7 | | | | |
| 16 | IC DIAG#8 | | | | | 1 | 1 | | Driver Diagnosis DATA#8 | | | | |
| 17 | IC STATUS#1 | 0 | 1 | 1 | 0 | 0 | 0 | | IC STATUS DATA#1 | | | | |
| 18 | IC STATUS#2 | | | | | 0 | 1 | | IC STATUS DATA#2 | | | | |
| 19 | IC STATUS#3 | | | | | 1 | 0 | | IC STATUS DATA#3 | | | | |
| 20 | IC STATUS#4 | | | | | 1 | 1 | | IC STATUS DATA#4 | | | | |
| 21 | IC COUNT#1 | 1 | 0 | 0 | 1 | 0 | 0 | | IC COUNTER DATA#1 | | | | |
| 22 | IC COUNT#2 | | | | | 0 | 1 | | IC COUNTER DATA#2 | | | | |
| 23 | IC COUNT#3 | | | | | 1 | 0 | | IC COUNTER DATA#3 | | | | |
| 24 | IC COUNT#4 | | | | | 1 | 1 | | IC COUNTER DATA#4 | | | | |
| 25 | IC COUNT#5 | 1 | 0 | 1 | 0 | 0 | 0 | | IC COUNTER DATA#5 | | | | |
| 26 | IC COUNT#6 | | | | | 0 | 1 | | IC COUNTER DATA#6 | | | | |
| 27 | IC COUNT#7 | | | | | 1 | 0 | | IC COUNTER DATA#7 | | | | |
| 28 | IC COUNT#8 | | | | | 1 | 1 | | IC COUNTER DATA#8 | | | | |

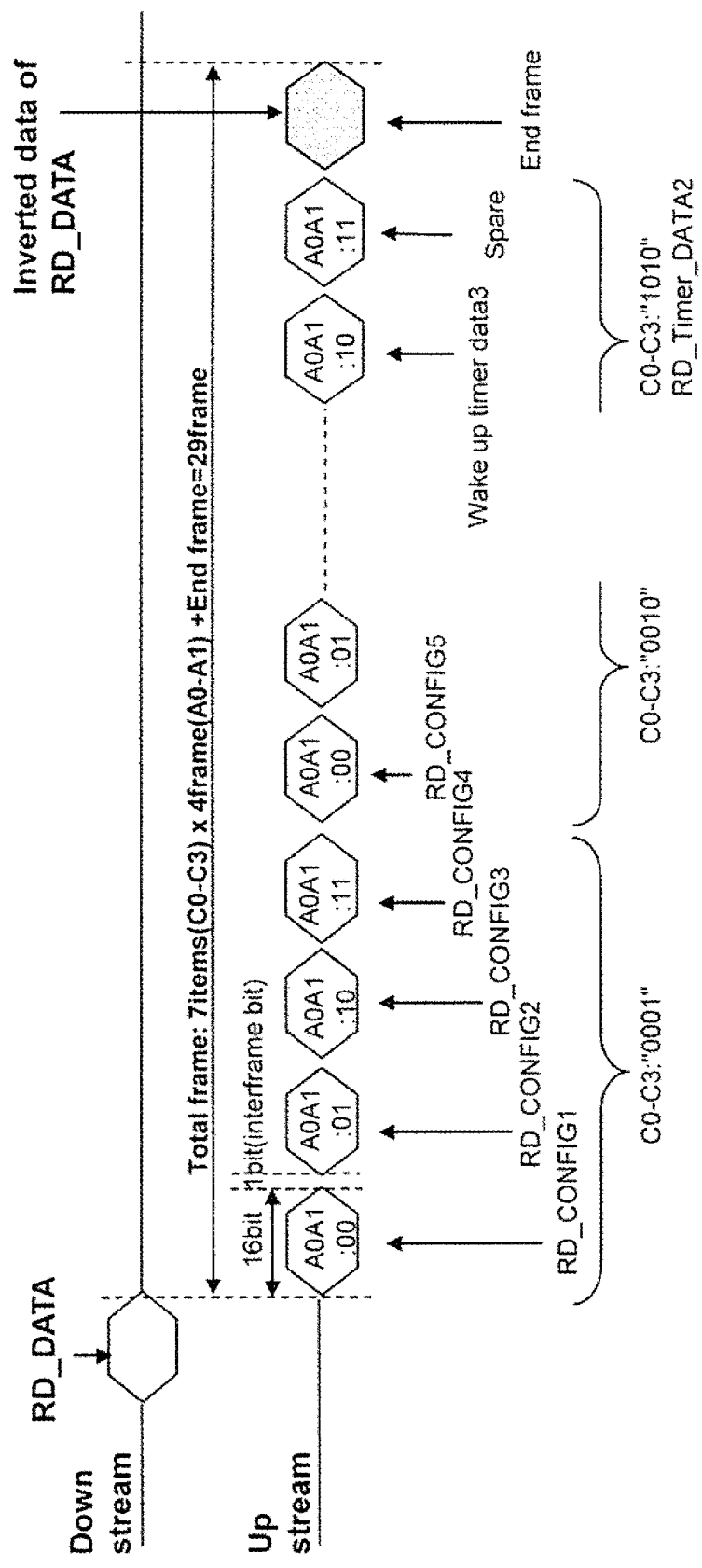
[Fig. 7]

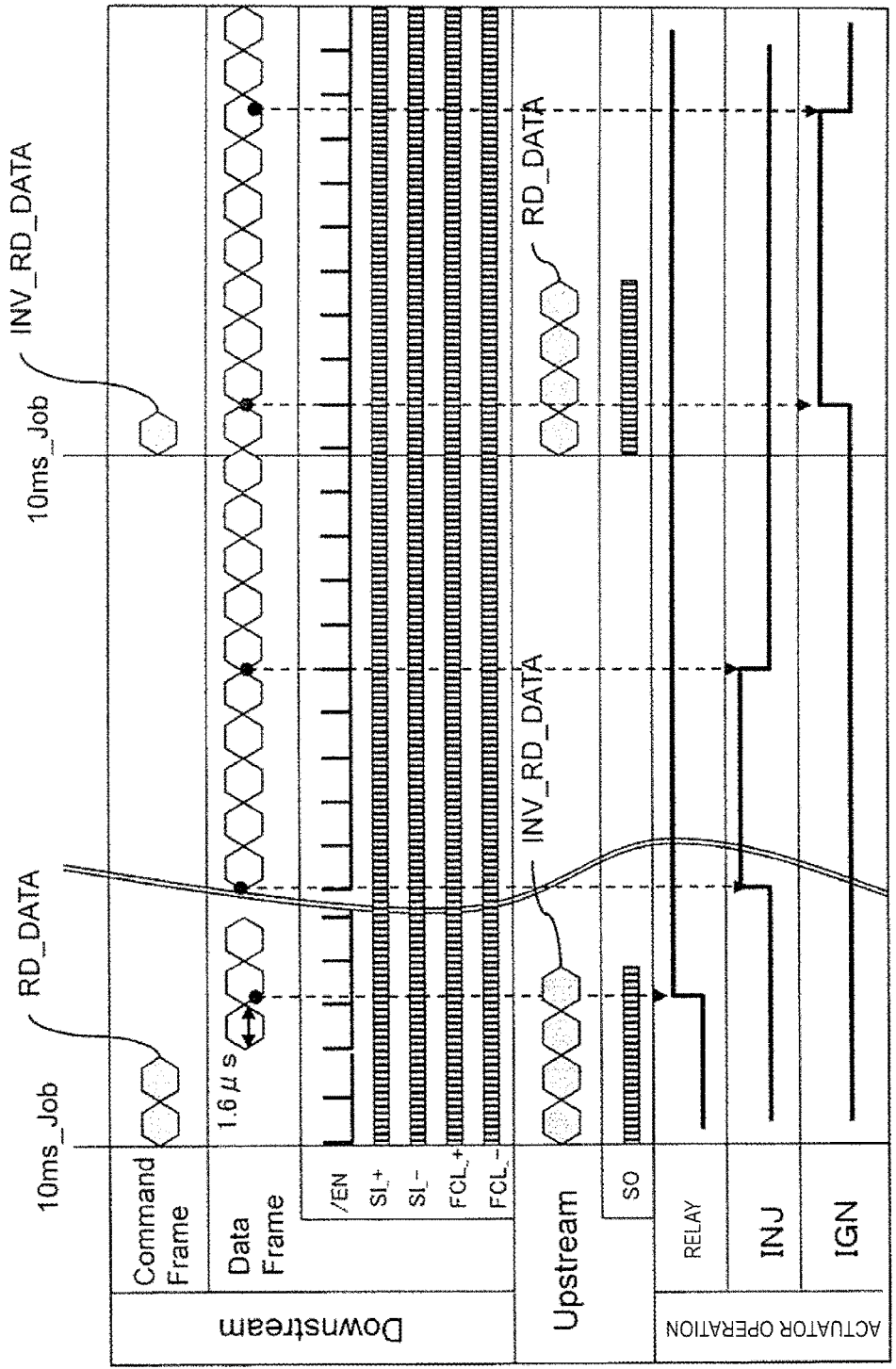
[Fig. 8]

VEHICLE CONTROL DEVICE

TECHNICAL FIELD

The present invention relates to a device which controls an operation of a vehicle.

BACKGROUND ART

In the related art, an electronic control unit (ECU) which controls an operation of a vehicle is provided with a driver integrated circuit (IC) which drives a vehicle load, and a microcomputer which controls the drive IC, and drives and controls the vehicle load by transmitting a parallel signal from a microcomputer to the driver IC.

Meanwhile, in recent years, the level of functions required in the ECU and a demand for low costs have increased. Here, in order to reduce the cost by reducing the number of ports of the microcomputer, it has been attempted to switch the parallel signal which is transmitted and received between the microcomputer and the driver IC to a serial signal. Communication in accordance with a micro-serial bus standard is an example thereof.

When the microcomputer and the driver IC communicate with each other by the serial signal, a plurality of control commands send and receive serial data which is written in series. In this case, when an abnormality occurs in the serial communication between the microcomputer and the driver IC, a control command with respect to the entire vehicle load driven by the driver IC becomes abnormal. Therefore, when an abnormality occurs in the serial communication between the microcomputer and the driver IC, it is considered that immediate detection of the abnormality and a shift of the vehicle into a fail-safe mode are necessary.

In the following PTL 1, a technology which relates to the detection of an abnormality of an electronic control unit, and detects an abnormality by echoing back (sending the data which is the same as the data received by a receiving side back to a transmitting side) control data, is described.

In the following PTL 2, a technique which relates to detection of an abnormality of an electronic control unit, and in which a detection signal is transmitted from a comparator 23 to a transceiver 12, the comparator 23 receives a comparison signal from the transceiver 12, and both the signals are compared to each other and the result thereof is reported to a CPU 21, is described. In PTL 2, by using the technique, it is detected whether or not there is a location where a signal line between a microcomputer 11 and a transceiver 12 is disconnected.

In PTL 3, it is described that, in communication between a main computer 1*a* provided in an ECU1 and a sub-computer 1*b*, the sub-computer 1*b* transmits data which is read out when a reading mode is performed and data in which all of the bits of the read-out data are inverted to the main computer 1*a*, and the main computer 1*a* compares the data to each other. The main computer 1*a* confirms whether or not the read-out data which is received from the sub-computer 1*b* is normal, by the above-described processing.

CITATION LIST

Patent Literature

PTL 1: JP-A-2000-312151
PTL 2: JP-A-2011-229079
PTL 3: JP-A-4-170829

SUMMARY OF INVENTION

Technical Problem

In the technology described in PTL 1, since the communication data itself is echoed back, there is a possibility that the communication data cannot be detected when the communication data itself is abnormal. For example, if the echoed-back data is deviated to either of a bit value 0 or a bit value 1, even when an abnormality occurs at any of the bit positions, there is a possibility that the abnormality is incorrectly recognized as normal data.

In the technology described in PTL 2, additional costs for providing the comparator 23 are necessary. In addition, since it is necessary to send the detection signal during the time when the microcomputer 11 and the transceiver 12 do not communicate with each other, timing for performing the detection is restricted.

In the technology described in PTL 3, since it is necessary to provide a computing function together with the main computer 1*a* and the sub-computer 1*b*, costs tend to increase. In addition, since the sub-computer 1*b* transmits both the read-out data and the bit-inverted data thereof to the main computer 1*a*, it is considered that a data amount which communicates for performing diagnosis tends to increase.

In consideration of the above-described problems, an object of the present invention is to provide a technology which can efficiently diagnose that both a driver circuit and a computing device can normally communicate with each other by a simple technique in a vehicle control device in which the driver circuit which does not have a computing function and the computing device communicate with each other.

Solution to Problem

A vehicle control device according to the present invention transmits diagnosis data as a control command from a computing portion to a driver circuit, and the driver circuit sends inverted diagnosis data in which the diagnosis data is bit-inverted back to the computing portion. The computing portion diagnoses whether or not communication between the computing portion and the driver circuit is normally performed, by using the diagnosis data and the inverted diagnosis data.

Advantageous Effects of Invention

According to the vehicle control device according to the present invention, since the driver circuit on the receiving side inverts the diagnosis data transmitted from the computing portion on the transmitting side and sends the inverted data back to the computing portion, it is possible to reliably perform diagnosis. In addition, since the diagnosis data is transmitted as a control command from the computing portion to the driver circuit, it is possible to perform the diagnosis at arbitrary timing by the computing portion. Furthermore, since it is possible to easily perform the diagnosis even when the driver circuit does not have a computing function, it is possible to suppress the cost for implementing the computing function.

BRIEF DESCRIPTION OF DRAWINGS

FIG. 1 is a configuration view of a vehicle control device 1000 according to Embodiment 1.

FIG. 2 is a view illustrating a bit arrangement of a control frame.

FIG. 3 is a view illustrating a bit arrangement of a data frame.

FIG. 4 is a view schematically illustrating a configuration example of a command map 220.

FIG. 5 is a view illustrating the bit arrangement of the data frame in upstream communication.

FIG. 6 is a view schematically illustrating a configuration example of the data frame in the upstream communication.

FIG. 7 is a view illustrating an example of timing when a microcomputer 100 transmits the diagnosis data, and timing when a driver circuit 200 transmits inverted diagnosis data back.

FIG. 8 is an example of a time chart of downstream communication and upstream communication.

DESCRIPTION OF EMBODIMENTS

<Embodiment 1>

FIG. 1 is a configuration view of a vehicle control device 1000 according to Embodiment 1 of the present invention. The vehicle control device 1000 is an ECU which controls an operation of a functional portion provided in a vehicle, and is provided with a microcomputer (computing portion) 100 and a driver circuit 200. Description of a vehicle load which is driven by the driver circuit 200 will be omitted.

The microcomputer 100 is provided with software 110 and an MSB interface (I/F) 120. The software 110 is a software group, such as an application or a BIOS, which implements processing of control of the vehicle operation. The MSB interface 120 is a communication interface which performs serial communication with the driver circuit 200. In Embodiment 1, the serial communication in accordance with a microsecond bus standard is performed, but a communication method is not limited thereto.

The MSB interface 120 is provided with a timer 121, a clock generator 122, a transmission register 123, and a reception register 124. The clock generator 122 generates a clock signal for synchronizing an operation between the microcomputer 100 and the driver circuit 200, and outputs the clock signal to the driver circuit 200 via one pair of clock wirings 320. The transmission register 123 is a register which temporarily accommodates the data transmitted from the MSB interface 120 to the driver circuit 200, and is connected to the driver circuit 200 via one pair of transmission wirings 330. The reception register 124 is a register which temporarily accommodates the data that the MSB interface 120 receives from the driver circuit 200, and is connected to the driver circuit 200 via one reception wiring 340.

The MSB interface 120 and the driver circuit 200 are further connected to each other via enabling signal wiring 310. When issuing a control command to the driver circuit 200, the MSB interface 120 transmits an enabling signal via the enabling signal wiring 310 at the same time when the control command is transmitted via the transmission wiring 330.

The driver circuit 200 is a driver IC which drives a vehicle load, and is configured to perform a function which is statically implemented on a circuit in advance. Therefore, the driver circuit 200 cannot execute a program, for example. The driver circuit 200 is provided with a reception register 210, a command map 220, an output register 230, a driver 240, an execution result register 250, and a transmission register 260.

The reception register 210 is a register which temporarily accommodates the data received from the MSB interface 120 via the transmission wiring 330. The command map 220 is a conversion table for converting a control command received as a serial data into a control command which is parallel to each driver 240, and will be described in detail. The output register 230 is a register which temporarily accommodates the control command which is converted by using the command map 220 and corresponds to each driver 240. The driver 240 is a circuit which drives each vehicle load, and only a required number of drivers 240 are provided in accordance with the type or the number of the vehicle loads driven by the driver circuit 200. The execution result register 250 is a register which receives operation data in which the obtained execution result is written from each driver 240 as a result of driving the vehicle load by each driver 240, and temporarily accommodates the operation data. The transmission register 260 is a register which temporarily accommodates data transmitted to the MSB interface 120.

It is desirable that the transmission register 123 and the reception register 124 are configured to be separated from each other electrically or logically so as to not cause bit interference. The reception register 210 and the transmission register 260 are also similar to the configuration of the transmission register 123 and the reception register 124.

The command map 220 can be configured by using a circuit device which realizes the function thereof. It is technically possible to configure the command map 220 by using the software implemented with equivalent functions and a processor which executes the software, but from the viewpoint of suppressing the implementation costs of the driver circuit 200, it is desirable that the driver circuit is configured by only using the circuit device as described above.

<Embodiment 1: Communication from Microcomputer 100 to Driver Circuit 200>

The microcomputer 100 transmits the control command to the driver circuit 200 via the transmission wiring 330. There is also a case where communication from the microcomputer 100 to the driver circuit 200 is called downstream communication. There are two types of frames in which the control command is written, such as a control frame and a data frame. An example of the data frame will be described hereinafter.

FIG. 2 is a view illustrating a bit arrangement of the control frame. The control frame is a frame in which a control command in a narrow sense is written. The control frame includes one selection bit illustrating the type of the frame, 5 command bits (C0 to C4) in which the type of the control command is written, 11 data bits (D0 to D10) in which the contents of the control command are written, and two invalid bits. The MSB interface 120 activates the enabling signal at the same time when transmitting the control frame to the driver circuit 200.

FIG. 3 is a view illustrating a bit arrangement of the data frame. The data frame is a frame for transmitting real data, such as numerical data included in the control command. The data frame includes one selection bit illustrating the type of the frame, 16 data bits (D0 to D15) in which contents of the data are written, and two invalid bits. The MSB interface 120 activates the enabling signal at the same time when transmitting the data frame to the driver circuit 200.

FIG. 4 is a view illustrating a configuration example of the command map 220. Since the control command transmitted by the MSB interface 120 is in the serial data, the control command with respect to the plurality of drivers 240 is written in series. Here, the driver circuit 200 extracts the control command with respect to each driver 240 that is written in the serial data by using the command map 220, and accommodates the control command in each output register 230. The output register 230 accommodates the control command with respect to each driver 240 in parallel. In other words, the driver circuit 200 converts the control command which is transmitted by the microcomputer 100 and written in the serial data, into the control command which is parallel to the plurality of drivers 240, by using the command map 220.

When the data which is received from the microcomputer 100 and written in the control frame matches any bit pattern illustrated in FIG. 4, the driver circuit 200 interprets that the bit row is the control command which corresponds to the bit pattern.

In the example of the data illustrated in FIG. 4, 16 types of control commands are illustrated as examples, but the invention is not limited thereto. In addition, the control command written as the first example is the diagnosis data which will be described later. In other words, the diagnosis data which will be described later is formally defined as one type of control command.

<Embodiment 1: Communication from Driver Circuit 200 to Microcomputer 100>

The driver circuit 200 has a function of self-diagnosing whether or not an abnormal state, such as an abnormal voltage generated by a circuit abnormality (for example, disconnection or a short circuit) in each driver 240, and accommodates the diagnosis result in the execution result register 250 as an operation data. For example, when the abnormal voltage is generated in the first driver 240, the driver circuit 200 has a function of setting the first bit value of the execution result register 250 to be 1, or the like.

However, since the driver circuit 200 does not have a computing function, the meaning of each bit value accommodated in the execution result register 250 cannot be interpreted. Here, the driver circuit 200 converts the operation data accommodated in the execution result register 250 into the serial data, and transmits the data to the microcomputer 100 via the transmission register 260 and the reception wiring 340. The microcomputer 100 diagnoses the operation data received from the driver circuit 200 by the function implemented in the software 110.

There is also a case where the communication from the driver circuit 200 to the microcomputer 100 is called upstream communication. The driver circuit 200 performs the downstream communication and the upstream communication asynchronously. In other words, the driver circuit 200 transmits the operation data in the execution result register 250, for example, at a constant operation period, to the microcomputer 100 regardless whether or not the control command is received from the microcomputer 100.

FIG. 5 is a view illustrating the bit arrangement of the data frame in the upstream communication. The data frame in the upstream communication includes 1 start bit, 4 bits of command field (C0 to C3), 2 bits of address field (A0 to A1), 6 bits of data field (D0 to D5), 1 parity bit, and 2 stop bits. When the plurality of data frames are continuously transmitted, 1 inter-frame bit is provided between the data frames. Since the upstream communication performs asynchronously with the downstream communication, the enabling signal is not necessary in the upstream communication.

FIG. 6 is view illustrating a configuration example of the data frame in the upstream communication. The driver circuit 200 converts the diagnosis result regarding each driver 240 into the serial data in accordance with a conversion rule as illustrated in FIG. 6, and accommodates the result in the transmission register 260. The serial data accommodated in the transmission register 260 is transmitted to the microcomputer 100, for example, at a constant operation period. Since the conversion rule illustrated in FIG. 6 is conversion which is reverse to processing of converting the serial data into the parallel data in the downstream communication, it is possible to implement the conversion rule on the command map 220.

<Embodiment 1: Diagnosis Data>

The driver circuit 200 transmits the operation data illustrating the presence or the absence of the abnormality in each driver 240 to the microcomputer 100. The abnormality diagnosis by the operation data is more likely to be diagnosis of an abnormality of the vehicle load, and is unlikely to diagnose an abnormality occurred in the driver circuit 200 itself.

Meanwhile, in the reception register 210 provided in the driver circuit 200, when an abnormality, such as bit-fixing (bit at a certain location is fixed), occurs, there is a possibility that the control command is not correctly transferred to the driver 240, and the vehicle operation is in a dangerous state. Similarly, when the abnormality occurs in the transmission register 260, the microcomputer 100 cannot correctly diagnose the operation of the driver 240. Similar failure can be generated even when the abnormality occurs in the transmission wiring 330 and the reception wiring 340.

There is a possibility that the driver circuit 200 itself can self-diagnose the above-described abnormality of the driver circuit 200 as the driver circuit 200 has the computing function and checks the data on each register or the data on each wiring, for example, by parity checking or the like. However, when the computing function is included in the driver circuit 200, the implementation costs of the driver circuit 200 increase. In addition, when the driver 240 is implemented in the driver circuit 200, there is a tendency that the driver 240 is likely to generate heat, and a cause of the generation of heat is added to when the computing function is further added. For this reason, implementing the driver 240 in the driver circuit 200 is not preferable from the viewpoint of a countermeasure against heat.

Here, in Embodiment 1, the microcomputer 100 transmits the diagnosis data for diagnosing whether or not the communication with the driver circuit 200 is normally performed to the driver circuit 200, and sends the bit-inverted data in which the diagnosis data is bit-inverted back to the microcomputer 100. The microcomputer 100 acquires a logical sum of the diagnosis data and the inverted diagnosis data, and if the bit of all of the results is 1, it is possible to confirm that the communication with the driver circuit 200 is normally performed.

The bit arrangement of the diagnosis data is arbitrary. For example, when "1100" is transmitted as the diagnosis data, the driver circuit 200 sends "0011" which is the inverted diagnosis data inverted from the diagnosis data back to microcomputer 100. The microcomputer 100 acquires the logical sum of "1100" and "0011", and if the bit of all of the results is 1 (1100+0011=1111), it is ascertained that the communication with the driver circuit 200 is normally performed. In other words, it is possible to confirm that the abnormality does not occur in any of the reception register 210, the transmission register 260, the transmission wiring 330, and the reception wiring 340.

FIG. 7 is a view illustrating an example of timing when the microcomputer 100 transmits the diagnosis data, and timing when the driver circuit 200 sends the inverted diagnosis data back. Various timings when the microcomputer 100 transmits the diagnosis data to the driver circuit 200 can be considered. In Embodiment 1, the diagnosis data is defined as one type of the control command from the microcomputer 100 to the driver circuit 200, and at the timing when the microcomputer 100 transmits the control command to the driver circuit 200, the diagnosis data can always be transmitted.

In the example illustrated in FIG. 7, the microcomputer 100 transmits the diagnosis data to the driver circuit 200 within an arbitrary execution period. The diagnosis data is defined as a control command "RD_DATA" illustrated as the first example of FIG. 4. The driver circuit 200 can determine whether or not the diagnosis data arrives by using the command map 220. When the control command RD_DATA arrives, the driver circuit 200 accommodates the inverted diagnosis data in which all of the bits of RA_DATA are inverted in the execution result register 250.

In the execution period for performing the upstream communication, the driver circuit 200 converts the operation data to the serial data in accordance with a conversion rule illustrated in FIG. 6. Furthermore, when the inverted diagnosis data is accommodated in the execution result register 250 in the previous execution period, the inverted diagnosis data is added to an appropriate position (for example, an end position) in the serial data.

In a case where the diagnosis data is transmitted to the driver circuit 200, then, when the upstream communication is received, the microcomputer 100 receives the inverted diagnosis data together with the operation data. The microcomputer 100 performs diagnosis in accordance with the above-described diagnosis rule.

FIG. 8 is an example of a time chart of the downstream communication and the upstream communication. Hereinafter, the example of the time chart of FIG. 8 will be described.

Since the microcomputer 100 and the driver circuit 200 perform serial communication, it is necessary to set a control period of the downstream communication combining with the required shortest communication period. In other words, it is necessary to satisfy the shortest control period among the control periods required for each vehicle load. Furthermore, when two-consecutive collating (the same data is transmitted two times in a row, and the data is considered as normal if the same data is transmitted two times) is used for confirming probability of control command, it is necessary to transmit the control command at a period of ½ of the shortest period.

In the example illustrated in FIG. 8, it is assumed that 3 types of loads, such as a relay load, an injector load, and an ignition load exist, and the control period required for the ignition load is the shortest period which is 3.2 μs. For this reason, it is necessary for the microcomputer 100 to transmit the control command to the driver circuit 200 at a period of 1.6 μs. A specific communication period may be appropriately determined in accordance with a load specification or required accuracy. As other types of load, for example, a solenoid circuit or a heater circuit are considered.

In addition, in the arbitrary communication period, the microcomputer 100 transmits the above-described diagnosis data (RD_DATA) to the driver circuit 200. Since the diagnosis data is defined as one control command, and it is possible to transmit the diagnosis data at arbitrary timing if there is no restriction, such as an order of the control command.

The driver circuit 200 performs the upstream communication asynchronously with the downstream communication, and transmits the operation data of each driver 240 to the microcomputer 100. When the diagnosis data is received at the previous upstream communication period, the driver circuit adds the inverted diagnosis data (INV_RD_DATA) in which the diagnosis data is bit-inverted to an appropriate location (in the example illustrated in FIG. 8, the end location) in the upstream communication.

When the diagnosis data is transmitted in the following downstream communication period, the microcomputer 100 transmits the data (which becomes equivalent to INV_RD_DATA) in which the diagnosis data of the previous period is bit-inverted to the driver circuit 200 as new diagnosis data. After this, similarly, the bit is inverted every time when the diagnosis data is transmitted. This is because all of the bit positions are diagnosed uniformly. Specific reasons thereof will be described in Embodiment 2.

The communication period of the upstream communication may be arbitrary (for example, a period of 10 ms), but since a computing load increases when a communication frequency increases, it is desirable to suppress the communication period to be as short as possible. For example, the communication period may be a communication speed which is necessary when performing the vehicle diagnosis, such as an OBD2 (on board diagnosis 2) on the microcomputer 100 side.

As timing for performing diagnosis processing illustrated in the example of FIG. 8, timing before the vehicle is started is desired. Specifically, it is desirable to perform the diagnosis processing at timing from the release of resetting of the vehicle control device 1000 to the start of the engine.

<Embodiment 1: Conclusion>

As described above, in the vehicle control device 1000 according to Embodiment 1, the microcomputer 100 transmits the diagnosis data to the driver circuit 200 as one control command, and the driver circuit 200 sends the inverted diagnosis data in which the diagnosis data is bit-inverted back to the microcomputer 100. Accordingly, at arbitrary timing of transmitting the control command, the microcomputer 100 can diagnose whether or not the communication with the driver circuit 200 is normally performed.

In addition, in the vehicle control device 1000 according to Embodiment 1, the microcomputer 100 performs the above-described diagnosis according to whether or not all of the bits of the logical sum of the diagnosis data and the inverted diagnosis data is 1. Since the diagnosis rule is the same regardless of the bit arrangement of the diagnosis data, it is possible to simplify the diagnosis processing on the microcomputer 100 side (it is not necessary to compare each bit in detail). In addition, since the driver circuit 200 may only invert the bit, it is possible to implement the above-described processing without using the computing function, for example, by a circuit (NOT circuit) which increases or decreases the voltage value showing the bit value.

In addition, in the vehicle control device 1000 according to Embodiment 1, the driver circuit 200 performs the upstream communication asynchronously with the downstream communication. Accordingly, since it is not necessary for the microcomputer 100 to wait for the result which transmits the diagnosis data, it is possible to further freely set the timing of transmitting the diagnosis data.

In addition, in the vehicle control device 1000 according to Embodiment 1, the driver circuit 200 makes the inverted diagnosis data in serial and transmits the inverted diagnosis data to the microcomputer 100 together with the operation data in which the self-diagnosis result of each driver 240 is written. Accordingly, since it is necessary to separately provide the communication period for transmitting the inverted diagnosis data, it is possible to alleviate the communication load.

In addition, in the vehicle control device 1000 according to Embodiment 1, the microcomputer 100 and the driver circuit 200 are connected to each other by a total of 6 wirings, such as 1 enabling wiring 310, 1 pair of clock wirings 320, 1 pair of transmission wirings 330, and 1 reception wiring 340, and performs the serial communication in accordance with an MSB standard. Accordingly, it is possible to suppress the number of terminals and wirings of each of the microcomputer 100 and the driver circuit 200 to be small.

<Embodiment 2>

In Embodiment 1, it is described that the diagnosis data transmitted by the microcomputer 100 may be arbitrary. However, in order to perform the diagnosis more efficiently, there is room for consideration of the bit arrangement of the diagnosis data. Here, in Embodiment 2 of the present invention, the bit arrangement of the diagnosis data which can perform the diagnosis more efficiently will be reviewed. The configuration of the vehicle control device 1000 is similar to that of Embodiment 1.

When the abnormality occurs in each register or wiring, there is a possibility that the bit value at a certain position is fixed to be the same value (bit-fixing). In order to detect the bit-fixing during a communication period as short as possible, it is desirable that the microcomputer 100 inverts all of the bits every time when the microcomputer 100 transmits the diagnosis data, and all of the bits within the two-communication period have both the bit value 0 and the bit value 1. This is similar to both the transmission register 123 and the reception register 124, and in addition, similar to both the reception register 210 and the transmission register 260 in the driver circuit 200.

In addition, there is a possibility that each register causes a short circuit due to a foreign substance, such as an adjacent bit, and an abnormality in which the bits always become the same value (bit short-circuiting) occurs. In order to avoid bit short-circuiting, it is desirable that the diagnosis data alternately have the bit value 0 and the bit value 1.

In consideration of the description above, it is desirable that the data alternately have the bit value 0 and the bit value 1 as the diagnosis data transmitted by the microcomputer 100, and the bit value is inverted every time when the diagnosis data is transmitted. In the example of RD_DATA illustrated on the first row of FIG. 4, based on the review, both the bit arrangement which starts from the bit value 0 and the bit arrangement which starts from the bit value 1, are defined as the RD_DATA.

<Embodiment 2: Conclusion>

As described above, the vehicle control device 1000 according to Embodiment 2 uses the bit arrangement which alternately have the bit value 0 and the bit value 1 as the diagnosis data. Accordingly, it is possible to detect the bit-fixing within the two-communication period, and to avoid wrong diagnosis due to the bit short-circuiting.

<Embodiment 3>

In the above-described Embodiments 1 to 2, when the abnormal bit is detected at any position of the diagnosis data, the microcomputer 100 can detect that the register address which corresponds to the bit position is abnormal. However, this abnormality is an abnormality which is detected by issuing the diagnosis data, and is not based on the operation data obtained from the driver 240. In other words, this abnormality does not show the vehicle load or an abnormality of the driver 240. At this time, as an operation which is performed by the microcomputer 100, for example, the following operations can be considered.

(Operation Example 1 when Abnormality is Detected)

The microcomputer 100 issues the control command of an indication to stop the vehicle load which corresponds to the bit position at which the abnormality is detected or the driver 240. However, since there is a possibility that the control command is not normally transferred to the driver 240 when the register is broken, it is necessary to transfer the control command to the driver 240, for example, via separate communication wiring.

(Operation Example 2 when Abnormality is Detected)

When the abnormality is detected at any of the bit positions of the diagnosis data, the microcomputer 100 switches the vehicle operation to a safety side, and the operation of the driver circuit 200 is stopped. Specifically, the enabling signal may be deactivated, and an operation stop command may be issued as the control command.

(Operation Example 3 when Abnormality is Detected)

The microcomputer 100 outputs the signal which shows the bit position at which the abnormality is detected or the contents equivalent thereto, for example, to the control device on a higher level.

<Embodiment 4>

The present invention is not limited to the above-described embodiments, and includes various modification examples. The above-described embodiments are described in detail to make the present invention easy to understand, but the invention is not necessarily limited to all of the configurations described above. In addition, it is possible to switch a part of a configuration of a certain embodiment to a configuration of another embodiment. In addition, it is possible to add a configuration of another embodiment to a configuration of a certain embodiment. In addition, it is possible to add, remove, and switch another configuration with respect to a part of a configuration of each embodiment.

In embodiments 1 to 3, as long as the restriction conditions, such as a device cost, is allowed, the driver circuit 200 can be configured by using a circuit device (an FPGA or the like) which is programmable by dynamically changing the circuit configuration, and the driver circuit 200 can be configured by only performing the function implemented on the circuit board in advance as described in Embodiment 1, and by using the circuit device which cannot dynamically change the circuit configuration. Otherwise, a minimum computing function which is not sufficient to realize the function given to the driver circuit 200 may be imparted to the driver circuit 200.

In Examples 1 to 3, it is described that the driver circuit 200 transmits the diagnosis data as the bit-inverted diagnosis data, but it is not necessary to invert and simultaneously transmit all of the bits of the diagnosis data, and only a part of the bits may be repeatedly inverted and transmitted. The microcomputer 100 diagnoses the entirety of the diagnosis data by repeating the diagnosis sequentially by using the bit-inverted data which is received from the driver circuit 200.

When a part of the bits of the diagnosis data is inverted, for example, switching of the command map 220 is indicated by the downstream communication from the microcomputer 100 to the driver circuit 200, and all of the bits may be diagnosed by performing the diagnose in order. In this case, on the command map 220, the command to make the diagnose data bit-inverted by a technique, such as a bit shift, is written, and the driver circuit 200 may perform the bit inversion by using the command. However, since the implementation costs or a diagnosis processing load of the driver circuit 200 increases, it is desirable to invert all of the bits at a time.

REFERENCE SIGNS LIST

100: MICROCOMPUTER
110: SOFTWARE
120: MSB INTERFACE
121: TIMER
122: CLOCK GENERATOR
123: TRANSMISSION REGISTER
124: RECEPTION REGISTER
200: DRIVER CIRCUIT
210: RECEPTION REGISTER
220: COMMAND MAP
230: OUTPUT REGISTER
240: DRIVER
250: EXECUTION RESULT REGISTER
260: TRANSMISSION REGISTER
310: ENABLING SIGNAL WIRING
320: CLOCK WIRING
330: TRANSMISSION WIRING
340: RECEPTION WIRING
1000: VEHICLE CONTROL DEVICE

The invention claimed is:

1. A vehicle control device, comprising:
a computing circuit; and
a driver circuit which drives one or more of a plurality of functional portions of a vehicle in accordance with a serial control command received from the computing circuit, wherein the driver circuit includes a plurality of drivers that are configured to perform functions which are statically implemented on the circuit in advance;
a transmission wiring, wherein the transmission wiring propagates a signal transmitted from the computing circuit to the driver circuit; and
a reception wiring, wherein the reception wiring propagates a signal transmitted from the driver circuit to the computing circuit,
wherein the computing circuit:
transmits diagnosis data to the driver circuit as the control command,
asynchronously receives, from the driver circuit using the reception wiring, inverted diagnosis data, wherein the inverted diagnosis data includes at least a part of the diagnosis data received by the driver circuit that is bit-inverted,
diagnoses whether or not the computing circuit and the driver circuit are communicating normally based on the diagnosis data and the inverted diagnosis data
performs a bit-inversion of the diagnosis every time the diagnosis data is transmitted to the driver circuit.

2. The vehicle control device according to claim 1, wherein the computing circuit further:
transmits the diagnosis data to the driver circuit at any execution period of outputting the control command to the driver circuit, and
wherein the driver circuit generates the inverted diagnosis data by bit-inverting the diagnosis data when the diagnosis data is received from the computing circuit in an execution period before transmitting the operation data to the computing circuit.

3. The vehicle control device according to claim 1, wherein the driver circuit further includes a reception register that stores data received from the computing circuit via the transmission wiring, and a transmission register that stores data transmitted to the computing circuit via the reception wiring, and
wherein the reception register and the transmission register are configured to be separated so as to not cause bit interference.

4. The vehicle control device according to claim 3, wherein the computing circuit diagnoses a location where an abnormality occurs in the reception register or the transmission register, and outputs a signal which shows a result thereof, by specifying the location in which a bit abnormality occurs in the diagnosis data or the inverted data, and by using the diagnosis data and the inverted diagnosis data.

5. The vehicle control device according to claim 4, wherein the computing circuit outputs the control command which indicates to stop the driver circuit to the driver circuit when a location where a bit abnormality occurs exists in the diagnosis data or the inverted data, and
wherein the driver circuit stops an operation of driving one or more of the plurality of functional portions in accordance with the control command received from the computing circuit.

6. The vehicle control device according to claim 1, wherein the computing circuit transmits data in which a bit value 0 and a bit value 1 are alternately disposed, to the driver circuit as the diagnosis data.

7. The vehicle control device according to claim 1, wherein the computing circuit further:
transmits the control command to the driver circuit, wherein the driver circuit:
receives the control command from the computing circuit,
converts the control command into a plurality of parallel control commands based on a reception command map which defines a corresponding relationship between bit data written in the control command and the plurality of drivers, and
concurrently issues the plurality of parallel control commands to the plurality of drivers as serial data.

8. The vehicle control device according to claim 7, wherein the computing circuit and the driver circuit communicate with each other in accordance with a microsecond bus standard.

9. The vehicle control device according to claim 1, wherein the driver circuit further:
transmits operation data that indicates an operation results of the plurality of functional portions to the computing circuit in one serial data transmission.

10. The vehicle control device according to claim 1, wherein the transmission wiring includes one pair of transmission wirings;
wherein the reception wiring includes one pair of reception wirings;
the vehicle control device further comprising:
one pair of clock wirings which transmit a clock signal from the computing circuit to the driver circuit; and
one validating signal wiring which transmits a validating signal that indicates validation of communication via the transmission wiring and the reception wiring, from the computing circuit to the driver circuit.

11. The vehicle control device according to claim 1, wherein the driver circuit drives at least any one of a solenoid circuit provided in the vehicle, a relay circuit provided in the vehicle, an injector circuit provided in the vehicle, an ignition circuit provided in the vehicle, and a heater circuit provided in the vehicle, as one or more of the plurality of functional portions.

* * * * *